United States Patent [19]
Borenstein

[11] 3,867,187

[45] Feb. 18, 1975

[54] POLYPROPYLENE FILAMENTS HAVING IMPROVED SOILING AND CROCKING CHARACTERISTICS

[75] Inventor: David E. Borenstein, Greenville, S.C.

[73] Assignee: Phillips Petroleum Company, Bartlesville, Okla.

[22] Filed: Mar. 26, 1973

[21] Appl. No.: 344,878

[52] U.S. Cl. ............... 117/138.8 E, 117/139.5 CQ, 264/176 F
[51] Int. Cl. ............................................ B44d 1/098
[58] Field of Search ............. 117/138.8 E, 139.5 F, 117/139.5 CQ; 264/211, 176 F

[56] References Cited
UNITED STATES PATENTS

| | | | |
|---|---|---|---|
| 2,765,293 | 10/1956 | Happoldt | 260/28.5 |
| 3,044,962 | 7/1962 | Brunt et al. | 117/139.5 X |
| 3,117,113 | 1/1964 | Tudor | 260/92.8 |
| 3,121,091 | 2/1964 | Green | 424/273 |
| 3,348,968 | 10/1967 | Hulbert et al. | 117/138.8 |
| 3,356,521 | 12/1967 | Boltniew | 117/138.8 X |
| 3,449,142 | 6/1969 | Hearst et al. | 117/138.8 X |
| 3,580,735 | 5/1971 | Shimodoi et al. | 264/211 X |
| 3,712,828 | 1/1973 | Bernard et al. | 117/138.8 X |
| 3,723,153 | 3/1973 | Nagata et al. | 117/138.8 X |

*Primary Examiner*—William E. Schulz

[57] ABSTRACT

A polypropylene filament having improved soiling and crocking characteristics is melt spun from an admixture of polypropylene and at least one N,N'-alkylenebis(alkanamide), and then coated with a finish coating comprising at least one quaternary ammonium salt compound.

18 Claims, No Drawings

POLYPROPYLENE FILAMENTS HAVING IMPROVED SOILING AND CROCKING CHARACTERISTICS

This invention relates to polypropylene filaments and methods for preparation thereof.

In the development of yarn for products such as carpeting, it has become desirable to produce yarns having low soiling rates, low crocking values, low yarn-to-metal friction, and low generation of static electricity. Various materials have been proposed for application to or incorporation in filaments to improve specific properties. However, the thus treated filaments still are deficient in at least one other property. Combination of materials or treatments have also been employed, but frequently the desired effect of one material is at least partially offset by a side-effect of another material.

Accordingly, it is an object of the present invention to provide a polypropylene filament having an improved balance of properties. It is an object of the invention to provide a polypropylene filament having a low soiling rate, a high resistance to crocking, a low value of yarn-to-metal friction, and a low value of generation of static electricity. Other objects, aspects and advantages of the invention will be apparent from a study of the specification and the appended claims to the invention.

In accordance with the invention, I have discovered that these objectives can be achieved by the incorporation into the polypropylene filament of at least one N,N'-alkylenebis(alkanamide) and the coating of the filament with at least one quaternary ammonium salt.

The polypropylenes suitable for use in the present invention are the crystalline homopolymers of propylene and the crystalline copolymers of propylene and at least one other monoolefin having up to 8 carbon atoms. Generally the other monoolefins are used in the production of the copolymers in an amount less than about 10 mol percent, preferably in the range of about 0.1 to about 5 mol percent, and more preferably in the range of about 0.1 to about 3 mol percent. Specific examples include fiber forming homopolymers of propylene, the fiber forming copolymers of propylene and ethylene, the fiber forming copolymers of propylene and butene-1, the fiber forming copolymers of propylene and hexene-1, the fiber forming copolymers of propylene and octene-1, and admixtures thereof.

The N,N'-alkylenebis(alkanamide)s which can be employed in the present invention include the wax compounds having the structural formula

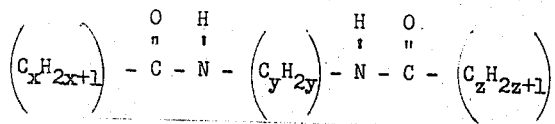

wherein $x$ and $z$ are integers in the range of 10 to 25, preferably in the range of 15 to 20, and $y$ is an integer in the range of 2 to 10, preferably in the range of 2 to 6. Exemplary compounds include N,N'-ethylenebis(undecanamide), N,N'-propylenebis(undecanamide), N,N'-tetramethylenebis(hexacosanamide), N,N'-tetramethylenebis(undecanamide), N,N'-pentamethylenebis(hexadecanamide), N,N'-hexamethylenebis(heneicosanamide), N,N'-octamethylenebis(undecanamide), N,N'-decamethylenebis(hexacosanamide), N,N'-ethylenebis(hexadecanamide), N,N'-ethylenebis(heptadecanamide), N,N'-ethylenebis(octadecanamide), N,N'-ethylenebis(nonadecanamide), N,N'-ethylenebis(eicosanamide), N,N'-ethylenebis(heneicosanamide), N,N'-ethylenebis(hexacosanamide), N,N'-trimethylenebis(hexadecanamide), N,N'-propylenebis(nonadecanamide), N,N'-trimethylenebis(2-methyleicosanamide), N,N'-propylenebis(hexacosanamide), N,N'-tetramethylenebis(hexadecanamide), N,N'-tetramethylenebis(octadecanamide), N,N'-tetramethylenebis(heneicosanamide), N,N'-pentamethylenebis(nonadecanamide), N,N'-pentamethylenebis(heneicosanimide), N,N'-hexamethylenebis(undecanamide), N,N'-(3-methylpentamethylend)bis(hexadecanamide), N,N'-hexamethylenebis(nonadecanamide), N,N'-hexamethylenebis(hexacosanamide), N,N'-octamethylenebis(nonadecanamide), N,N'-octamethylenebis(hexacosanimide), N,N'-decamethylenebis(undecanamide), N,N'-decamethylenebis(heptadecanamide), N-[3-(4-ethylpentadecanamide)butyl]-2-methyloctadecanamide and admixtures thereof.

The wax compound can be added to the propylene polymer in any suitable manner known to the art. For example, the addition of the wax compound can be accomplished by dry blending, followed by melting and extrusion of the admixture. The wax compound can also be added to a hot melt of the polymer of propylene. The wax compound can be employed in any desired amount, but will generally be utilized in an amount in the range of about 0.1 to about 10 weight per cent of the filament, and preferably will be in the range of about 0.1 to about 5 weight percent of the filament, and more preferably in the range of about 0.5 to about 2 weight percent of the filament.

In addition to the wax compound, other compatible additives can be included in the propylene polymer composition. For example, various oxidation stabilizers, ultraviolet stabilizers, fillers, pigments, and dyes can be included in the formulation to be melt spun.

The quaternary ammonium salt compounds which can be employed in the invention include those having the structural formula

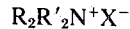

wherein each R is individually selected from saturated hydrocarbyl radicals having from 10 to 25 carbon atoms, preferably from 15 to 20 carbon atoms, each R' is individually selected from saturated hydrocarbyl radicals having from 1 to 8 carbon atoms, preferably from 1 to 4 carbon atoms, and X is a halogen, preferably chlorine or bromine, with chlorine being presently most preferred. Exemplary compounds include didecyl dimethyl ammonium chloride, didecyl diethyl ammonium bromide, bis(2-ethyloctyl) dipropyl ammonium chloride, didecyl dibutyl ammonium fluoride, didecyl dicyclohexyl ammonium iodide, didecyl bis(2-ethylhexyl) ammonium chloride, dicyclododecyl dimethyl ammonium bromide, didodecyl diisobutyl ammonium chloride, dipentadecyl dimethyl ammonium chloride, bis(3-methyltetradecyl) diethyl ammonium bromide, dipentadecyl dibutyl ammonium fluoride, dihexadecyl dimethyl ammonium chloride, bis(10-cyclohexyldecyl) diethyl ammonium iodide, bis(5- octylcyclooctyl) diisopropyl ammonium chloride, dihexadecyl dibutyl ammonium bromide, dihexadecyl bis(cyclopentylmethyl) ammonium chloride, dihexadecyl bis(3-propylcyclopentyl) ammonium bromide, diheptadecyl dimethyl ammonium fluoride, diheptadecyl diethyl ammonium chloride, diheptadecyl dibutyl ammonium bromide, dioctadecyl dimethyl ammonium chloride, bis(3-methylheptadecyl) diethyl ammonium iodide, dioctadecyl dihexyl ammonium bromide, dinonadecyl dimethyl ammonium chloride, dinonadecyl diethyl ammonium bromide, dinonadecyl diisopentyl ammonium chloride, dieicosyl dimethyl ammonium bromide, dieicosyl diethyl ammonium fluoride, dieicosyl dibutyl ammonium chloride, ditricosyl dimethyl ammonium iodide, ditricosyl diethyl ammonium chloride, ditricosyl dibutyl ammonium bromide, dipentacosyl dimethyl ammonium chloride, dipentacosyl dibutyl ammonium bromide, dipentacosyl dioctyl ammonium chloride, hexadecyl octadecyl methyl ethyl ammonium chloride, and admixtures thereof.

In a presently preferred embodiment, the finish coating also contains at least one wetting agent and at least one corrosion inhibitor. A suitable wetting agent is a polyethoxylated straight chain alcohol. A suitable corrosion inhibitor is sodium nitrite with borax added as a buffering agent. The finish coating can be applied to the spun filament in any suitable manner known in the art in one or more coating operations. The finish coating can be employed in any desired amount, but generally will be utilized in an amount sufficient to provide from about 0.15 to about 0.5 weight percent of the quaternary ammonium salt compound based on the weight of the uncoated filament. The preferred range for the quaternary ammonium salt compound is from about 0.2 to about 0.4 weight percent based on the weight of the uncoated filament.

The following example is presented in further illustration of the invention, and should not be construed in undue limitation thereof.

EXAMPLE

In each of the following runs a crystalline homopolymer of polypropylene having a melt flow of 12 was blended with 0.75 weight percent tangerine pigment, 0.1 weight percent $TiO_2$, and 1 weight percent N,N'-ethylenebis(stearamide), if present, and melt extruded to form filaments. A finish was applied to the filaments, and the filaments were then drawn and textured and employed as the face yarn of a tufted carpet. The results are presented in the following table:

In the appearance, carpet crock rating and yarn crock rating, 5 is the best rating and 1 is the worst, with a value of $\geq 3.8$ considered to be acceptable. Run 3 represents the use of the wax compound of the invention without the presence of the quaternary ammonium salt compound, while run 4 represents the use of the quaternary ammonium salt compound without the wax compound. Run 5 shows the desirable balance of properties obtained through the employment of the claimed combination. Runs 6 and 7 show that this desirable balance of properties is not achieved when Carbowax (polyethylene glycol) is employed as the finish even though N,N'-ethylenebis(stearamide) is incorporated into the polymer. The yarn of run 5 had a yarn-to-metal friction of 200 grams in contrast to a yarn-to-metal friction of 315 grams for the yarn of Run 4. The yarn of Run 5 had a static electricity generation of −35 volts in contrast to −510 volts for the yarn of Run 4.

Reasonable variations and modifications are possible within the scope of the foregoing disclosure and the appended claims to the invention.

That which is claimed is:

1. A filament melt spun from an admixture of a filament forming polymer of propylene and at least one wax compound having the formula

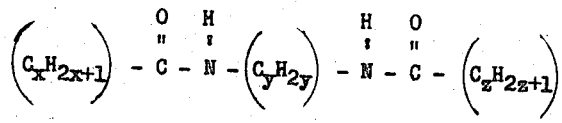

wherein $x$ and $z$ are integers in the range of 10 to 25 and $y$ is an integer in the range of 2 to 10; said polymer of propylene being selected from the group consisting of fiber forming homopolymers of propylene, fiber forming copolymers of propylene and at least one other monoolefin having up to 8 carbon atoms, and admixtures thereof; said filament having a finish coating thereon of at least one quaternary ammonium salt compound having the formula

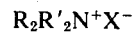

wherein each R is individually selected from saturated hydrocarbyl radicals having from 10 to 25 carbon atoms, each R' is individually selected from saturated hydrocarbyl radicals having from 1 to 8 carbon atoms, and X is a halogen radical.

2. A filament in accordance with claim 1 wherein said finish coating further comprises at least one corrosion inhibitor.

TABLE

SOILING AND CROCKING OF TEST CARPETS

| Run No. | Wax[a] | Finish[a] | Wt. % Finish On Yarn | 2000-Step Appearance | | Carpet Crock Rating (Unsoiled) | | | | Yarn Crock Rating | |
|---|---|---|---|---|---|---|---|---|---|---|---|
| | | | | | | Latexed(Not Cured) | | Latexed & Cured | | | |
| | | | | Soiled | Shampooed | Dry | Wet | Dry | Wet | Dry | Wet |
| 1 | No | Scoured[c] | 0[c] | 2.3 | 4.0 | 4.2 | 4.5 | 4.3 | 4.8 | — | — |
| 2 | No | Scoured[c] | 0[c] | 2.2 | 4.2 | 4.3 | 4.7 | 4.3 | 4.8 | — | — |
| 3 | Yes | Scoured[c] | 0[c] | 3.8 | 4.7 | 4.0 | 4.7 | 4.3 | 5.0 | — | — |
| 4 | No | A | 0.27 | 3.2 | 4.5 | 4.2 | 3.8 | 4.3 | 3.7 | 4.3 | 3.5 |
| 5 | Yes | A | 0.24 | 4.0 | 4.8 | 3.8 | 5.0 | 4.5 | 5.0 | 4.2 | 4.8 |
| 6 | No | B | 0.6 | 2.0[b] | 3.0[b] | — | — | 3.7 | 4.3 | — | — |
| 7 | Yes | B | 0.6 | 2.5[b] | 3.5[b] | — | — | 1.7 | 4.2 | — | — |

[a] N,N'-ethylenebis(stearamide)
[b] 1800-step appearance
[c] The carpet was scoured in hot water to remove all finish before the carpet was subjected to soiling.
[a] A is 94.5 weight % dioctadecyl dimethyl ammonium chloride, 0.5 weight % nonionic wetting agent, 1 weight % borax and 4 weight % sodium nitrite; B is polyethylene glycol.

3. A filament in accordance with claim 1 wherein $x$ and $z$ are integers in the range of 15 to 20, $y$ is an integer in the range of 2 to 6, each R has from 15 to 20 carbon atoms, each R' has from 1 to 4 carbon atoms, and X is selected from the group consisting of chlorine and bromine.

4. A filament in accordance with claim 1 wherein said wax compound is present in said filament in an amount in the range of about 0.1 to about 10 weight percent of said filament, and wherein said quaternary ammonium salt compound is present in said filament in an amount in the range of about 0.15 to about 0.5 weight percent of said filament.

5. A filament in accordance with claim 4 wherein $x$ and $z$ are integers in the range of 15 to 20, $y$ is an integer in the range of 2 to 6, each R has from 15 to 20 carbon atoms, each R' has from 1 to 4 carbon atoms, and X is chlorine.

6. A filament in accordance with claim 5 wherein said finish coating further comprises at least one corrosion inhibitor.

7. A filament in accordance with claim 6 wherein said wax compound is N,N'-ethylenebis(stearamide) and said quaternary ammonium salt is dioctadecyl dimethyl ammonium chloride.

8. A filament in accordance with claim 7 wherein said corrosion inhibitor comprises sodium nitrite.

9. A filament in accordance with claim 1 wherein said wax compound is present in said filament in an amount in the range of about 0.5 to about 2 weight percent of said filament, and wherein said quaternary ammonium salt compound is present in said filament in an amount in the range of about 0.2 to about 0.4 weight percent of said filament.

10. A filament in accordance with claim 9 wherein said wax compound is N,N'-ethylenebis(stearamide) and said quaternary ammonium salt is dioctadecyl dimethyl ammonium chloride.

11. A filament in accordance with claim 10 wherein said finish coating consists essentially of said quaternary ammonium salt compound, at least one wetting agent and at least one corrosion inhibitor.

12. A process comprising melt spinning a filament from an admixture of a filament forming polymer of propylene and at least one wax compound having the formula

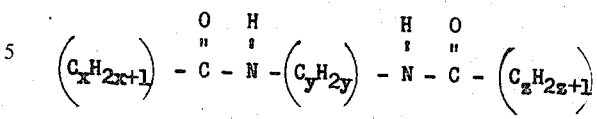

wherein $x$ and $z$ are integers in the range of 10 to 25 and $y$ is an integer in the range of 2 to 10; said polymer of propylene being selected from the group consisting of fiber forming homopolymers of propylene, fiber forming copolymers of propylene and at least one other monoolefin having up to 8 carbon atoms, and admixtures therof; and applying to the thus melt spun filament a finish coating of at least one quaternary ammonium salt compound having the formula $$R_2R'_2N^+X^-$$

wherein each R is individually selected from saturated hydrocarbyl radicals having from 10 to 25 carbon atoms, each R' is individually selected from saturated hydrocarbyl radicals having from 1 to 8 carbon atoms, and X is a halogen.

13. A process in accordance with claim 12 wherein said wax compound is present in said admixture in an amount in the range of about 0.1 to about 10 weight percent of said admixture, and wherein said quaternary ammmonium salt compound is applied to said filament in an amount in the range of about 0.15 to about 0.5 weight percent of said filament.

14. A process in accordance with claim 13 wherein said wax compound is N,N'-ethylenebis(stearamide) and said quaternary ammonium salt is dioctadecyl dimethyl ammonium chloride.

15. A filament in accordance with claim 1 wherein said polymer of propylene comprises a homopolymer of propylene.

16. A filament in accordance with claim 10 wherein said polymer of propylene comprises a homopolymer of propylene.

17. A process in accordance with claim 12 wherein said polymer of propylene comprises a homopolymer of propylene.

18. A process in accordance with claim 14 wherein said polymer of propylene comprises a homopolymer of propylene.

* * * * *